(12) United States Patent
Ishibashi

(10) Patent No.: US 9,395,941 B2
(45) Date of Patent: Jul. 19, 2016

(54) INFORMATION PROCESSING APPARATUS, PORTABLE TERMINAL, AND CONTROL METHOD THEREFOR

(71) Applicant: CANON IMAGING SYSTEMS INC., Niigata-shi, Niigata (JP)

(72) Inventor: Naohiro Ishibashi, Nagaoka (JP)

(73) Assignee: CANON IMAGING SYSTEMS INC., Niigata-Shi, Niigata (JP)

( * ) Notice: Subject to any disclaimer, the term of this patent is extended or adjusted under 35 U.S.C. 154(b) by 0 days.

(21) Appl. No.: 14/752,298

(22) Filed: Jun. 26, 2015

(65) Prior Publication Data

US 2015/0293730 A1    Oct. 15, 2015

Related U.S. Application Data

(63) Continuation of application No. PCT/JP2013/085325, filed on Dec. 25, 2013.

(30) Foreign Application Priority Data

Dec. 28, 2012  (JP) ................................. 2012-288309
Nov. 29, 2013  (JP) ................................. 2013-247802

(51) Int. Cl.
  *G06F 15/00*   (2006.01)
  *G06F 3/12*    (2006.01)
  *G06K 1/00*    (2006.01)

(52) U.S. Cl.
  CPC .............. *G06F 3/1231* (2013.01); *G06F 3/122* (2013.01); *G06F 3/1232* (2013.01);
  (Continued)

(58) Field of Classification Search
  USPC .................................................. 358/1.1–1.18
  See application file for complete search history.

(56) References Cited

U.S. PATENT DOCUMENTS 8,423,001 B2 * 4/2013 Lauper .............. G06F 17/30876
                                                340/572.1
8,683,554 B2 * 3/2014 Martin .................... G06F 9/541
                                                    717/168

(Continued)

FOREIGN PATENT DOCUMENTS

JP         06021944 A     1/1994
JP       2010218347 A     9/2010

(Continued)

OTHER PUBLICATIONS

International Search Report issued in PCT/JP2013/085325 dated Apr. 15, 2014. English translation provided.

(Continued)

*Primary Examiner* — Douglas Tran
(74) *Attorney, Agent, or Firm* — Rossi, Kimms & McDowell LLP

(57) ABSTRACT

An information processing apparatus which is capable of remotely operating a device through a portable terminal while reducing burden and cost to introduction without concentrating load on the portable terminal. The information processing apparatus is connected to a portable terminal through a first network. Individual identification information that a first interface unit of the portable terminal has is obtained, and generates a virtual interface based on the individual identification information concerned is generated. Address information is obtained from a device connected to the portable terminal through a second network. A part of the obtained address information is changed and the changed address information is set to the virtual interface. A device connected to the first interface unit of the portable terminal is simulated through the virtual interface as if the device concerned were directly connected to the virtual interface.

12 Claims, 6 Drawing Sheets

(52) U.S. Cl.
CPC ........... *G06F 3/1236* (2013.01); *G06F 3/1285* (2013.01); *G06F 3/1292* (2013.01); *G06F 3/1222* (2013.01); *G06F 3/1289* (2013.01)

(56) References Cited

U.S. PATENT DOCUMENTS

| | | |
|---|---|---|
| 2010/0241772 A1 | 9/2010 | Kugimoto et al. |
| 2012/0221736 A1 | 8/2012 | Endo et al. |

FOREIGN PATENT DOCUMENTS

| | | |
|---|---|---|
| JP | 2011129111 A | 6/2011 |
| JP | 2012138694 A | 7/2012 |
| WO | 2011055831 A1 | 5/2011 |
| WO | 2014104398 A1 | 7/2014 |

OTHER PUBLICATIONS

Written Opinion issued in PCT/JP2013/085325 dated Apr. 15, 2014.

\* cited by examiner

INFORMATION PROCESSING APPARATUS, PORTABLE TERMINAL, AND CONTROL METHOD THEREFOR

FIELD OF THE INVENTION

The present invention relates to an information processing apparatus, a portable terminal, and a control method therefor for controlling a device like a printer through a network.

DESCRIPTION OF THE RELATED ART

A remote desktop technology that builds a virtual private network (VPN) and remotely operates apparatuses (a PC, a peripheral apparatus) connected to a network of a remote place from an information processing apparatus, such as a personal computer, connected to a LAN of a home or an office had been known. The VPN connects networks of remote places while keeping secrecy through a communication line, such as the Internet line and a mobile network (mobile phone line), for example, in a similar manner to be connected through a LAN, and enables data communication.

Moreover, there is a proposed system in which a plurality of peripheral devices (a display, mouse, keyboard, printer, etc.) are collectively connected to a portable terminal, such as a smart phone, through a hub device, and that achieves a remote desktop environment by a remote server that is connected to the portable terminal through a network (for example, see Japanese Laid-Open Patent Publication (Kokai) No. 06-021944).

However, since the remote desktop system of the conventional technique needs to provide the communication line that connects base points and the devices necessary for the VPN connection, and the devices must be set up, there is a problem of much burden and cost to introduction. On the other hand, since the system of the above-mentioned patent document 1 is configured to control the peripheral devices by the remote server through the portable terminal, burden and cost to introduction are reduced. However, since various drivers corresponding to the peripheral devices are introduced, and the peripheral devices are controlled while communicating with the remote server, there is a problem in that load is concentrated on the portable terminal.

SUMMARY OD THE INVENTION

Accordingly, the present invention has an object to provide an information processing apparatus, portable terminal, and control method therefor, which enable the information processing apparatus to remotely operate a device through the portable terminal while reducing burden and cost to introduction without concentrating load on the portable terminal.

In order to achieve the above-mentioned object, an information processing apparatus according to the present invention provides an information processing apparatus connected to a portable terminal through a first network, the information processing apparatus comprising a processor configured to execute: a virtual interface generation task that obtains individual identification information that a first interface unit of the portable terminal has, and generates a virtual interface based on the individual identification information concerned; an address information obtaining task that obtains address information from a device connected to the portable terminal through a second network; an address information setting task that changes a part of the address information obtained by the address information obtaining task and sets the changed address information to the virtual interface; and a virtualization control task that simulates a device connected to the first interface unit of the portable terminal through the virtual interface as if the device concerned were directly connected to the virtual interface.

In order to achieve the above-mentioned object, a portable terminal according to the present invention provides a portable terminal equipped with a first interface unit that transmits and receives data in a first data format and a second interface means that transmits and receives data in a second data format, the portable terminal comprising a processor configured to: an individual identification information transmitting task that transmits individual identification information of the first interface unit to an information processing apparatus connected to the portable terminal through a first network; an address information obtaining unit that obtains address information from a device connected to the portable terminal through a second network; an address information transmitting task that transmits the address information obtained by the address information obtaining unit to the information processing apparatus based on the individual identification information; a virtualization control task that simulates a device connected to the first interface unit through a virtual interface that the information processing apparatus generates based on the individual identification information as if the device concerned were directly connected to the virtual interface; and a data format converting task that converts the first data format and the second data format mutually when the virtualization control task makes the information processing apparatus simulate the device concerned.

According to the present invention, the information processing apparatus is able to remotely operate a device through the portable terminal while reducing burden and cost without concentrating load on the portable terminal.

Further features of the present invention will become apparent from the following description of an exemplary embodiment with reference to the attached drawings

DESCRIPTION OF THE EMBODIMENTS

Hereafter, an example of a device control system according to an embodiment of the present invention will be described with reference to the attached drawings.

[First Embodiment]

Figure 1:
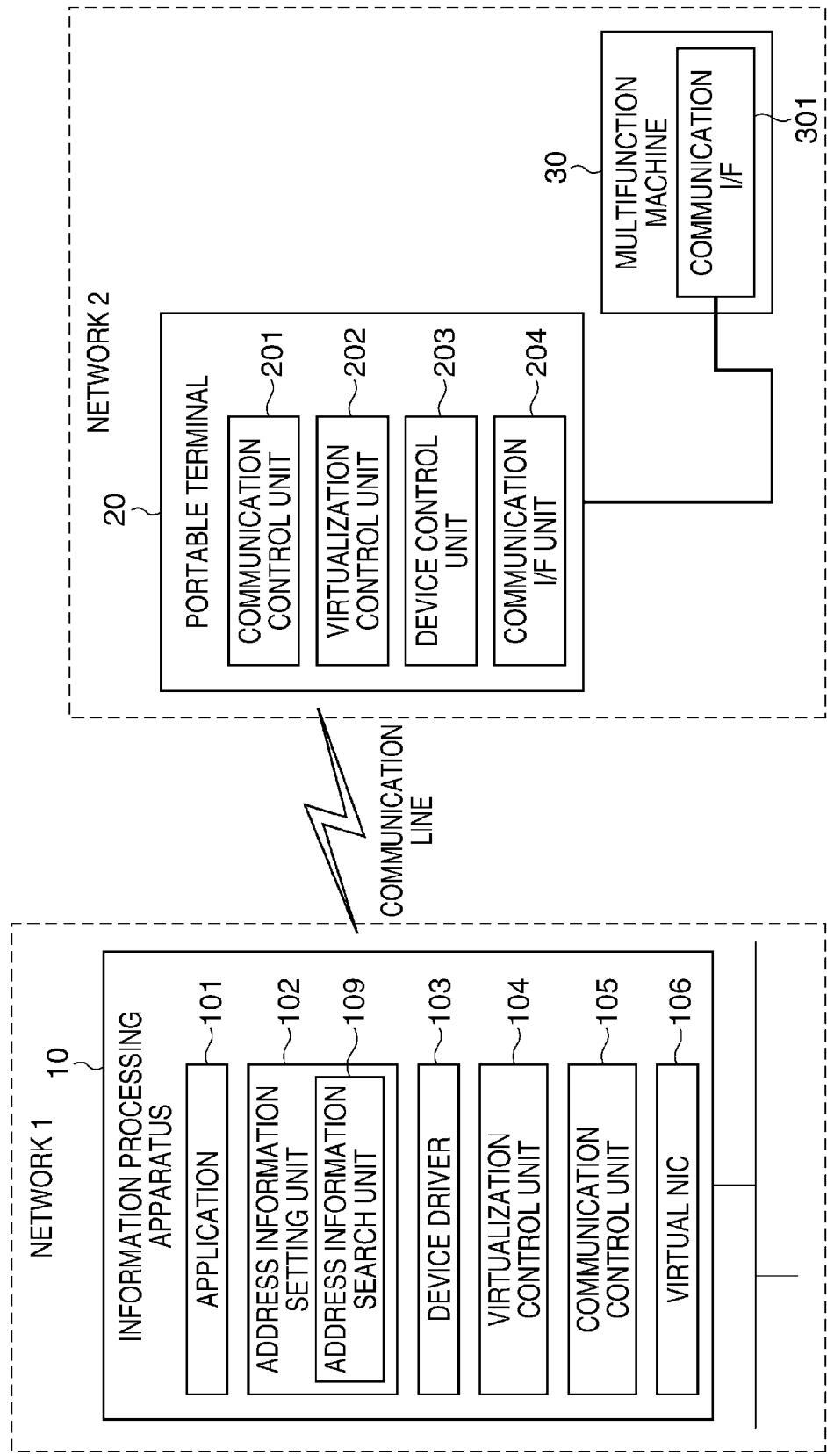
FIG. 1 is a block diagram showing an example of a schematic configuration of a device control system according to a first embodiment of the present invention.

FIG. 1 is a block diagram showing an example of a schematic configuration of a device control system according to a first embodiment of the present invention. The device control system concerning the first embodiment consists of an information processing apparatus 10 connected to a LAN on a network 1, a portable terminal 20 and a multifunction machine 30 connected to a LAN on a network 2 that is different from the network 1.

The portable terminal 20 is provided with a communication interface connectable with the multifunction machine 30, and is connected to the information processing apparatus 10 on the network 1 through a communication line, such as a wireless line like a wireless LAN and a mobile line, or a wire line.

Furthermore the network 2 is managed by a network address architecture that is different from that of the network 1. The network 2 may be a network of the same floor as the network 1 or may be a network of a remote place.

The information processing apparatus 10 is a personal computer (PC) etc., for example, and is provided with a CPU, input units, a display unit, memories, a storage unit, a communication unit, etc., which are not shown in FIG. 1, as a hardware configuration. These hardware components are mutually connected through an internal bus.

The CPU is a central processing unit that controls various parts in the information processing apparatus 10. The input units are operating devices, such as a keyboard and a mouse. The display unit is a display device, such as a liquid crystal display monitor. The memories are storage units, such as a RAM and a ROM. In the communication unit, for example, it is an interface for connecting with communication line, such as a wireless line like a wireless LAN and a mobile line, or a wire line, and data transmission and reception through the communication line becomes possible.

In the storage unit, an operating system (hereinafter referred to as an "OS") as software that is not illustrated, an application 101, an address information setting unit 102, an address information search unit 109, a device driver 103, a virtualization control unit 104, a communication control unit 105, and a virtual NIC 106 are stored, and software concerning another function is stored. Furthermore, these software modules are read onto the memory and operate according to the control of the CPU.

The application 101 is a software program group for communicating with the portable terminal 20 and the multifunction machine 30 by instructing a data input-output request to the device driver 103.

The address information setting unit 102 is provided with a function to set up address information (an IP address) to the virtual NIC 106 (mentioned later). Furthermore, although the IP address was exemplified as the address information, it is not limited to this, but a MAC address, a device name, etc. can be used. Further, a combination of these pieces of information may be used.

The address information search unit 109 is provided with a function to search for the address information set to a communication I/F 301 of the multifunction machine 30 and to obtain the address information of the multifunction machine 30.

The device driver 103 converts a data input-output request from the OS or the application into data (hereinafter referred to as a "control command") in a data format corresponding to the multifunction machine 30, and transmits the control command concerned to the virtualization control unit 104. Further, the device driver 103 notifies the application 101 of a response to the control command.

The virtualization control unit 104 converts the control command transmitted from the device driver 103 (i.e., the data input-output request) into packet data based on a USB data format (hereinafter referred to as "USB data"). Moreover, the virtualization control unit 104 converts the USB data transmitted from the communication control unit 105 into the same data format as the control command, and transmits to the device driver 103.

Further, the virtualization control unit 104 has a function that simulates a behavior similar to that in a case where the multifunction machine 30 is directly connected to the information processing apparatus 10 (local connection) in response to a data transmission-reception request to the multifunction machine 30 (hereinafter referred to as "virtualization control"). With this virtualization control function, the information processing apparatus 10 can transmit and receive data while recognizing as if the multifunction machine 30 is locally connected.

The communication control unit 105 performs a conversion process between the USB data transmitted from the virtualization control unit 104 and the network packet at the time of communicating with the portable terminal 20, and controls transmission and reception of data between the portable terminal 20 and the information processing apparatus 10. Moreover, the communication control unit 105 controls connection and disconnection of the communication line (session thereof) between the portable terminal 20 and the information processing apparatus 10 in response to the data transmission-reception request transmitted from the virtualization control unit 104.

The virtual NIC 106 is a network adaptor (software module) generated on the basis of device information (individual identification information) about a communication I/F unit 204 (mentioned later) of the portable terminal 20 that is recognized to be connected to the information processing apparatus 10 by the virtualization control according to the instruction from the device driver 103. In this embodiment, since the communication I/F unit 204 is recognized as a USB device, the virtual NIC 106 is generated on the basis of information (USB descriptor information), such as a vendor ID, product ID, and serial number.

The portable terminal 20 is an apparatus, such as a mobile phone, PDA, and smart phone, for example, and is provided with a CPU, memories, a storage unit, a communication unit, etc. as hardware components that are not shown in FIG. 1.

The CPU is a central processing unit that controls various parts in the portable terminal 20. The memories are a RAM, a ROM, etc. The communication unit is an interface for performing data transmission and reception through a wireless line, such as a wireless LAN and a mobile line, or a wire line. It becomes possible to transmit and receive data with the information processing apparatus 10 on the network 1 through these lines.

In the storage unit, an OS (not shown), a communication control unit 201, a virtualization communication unit 202, and a device control unit 203 are stored as software modules, and software concerning another function is stored. Hereinafter, only what relates to the present invention will be described.

The communication control unit 201 connects with an internet line, a mobile network (mobile phone line), etc. (hereinafter referred to as a "communication line"), for example, and controls communication between the information processing apparatus 10 and the portable terminal 20. Moreover, the communication control unit 201 converts the USB data transmitted from the virtualization control unit 202 into the network packet, and transmits to the information processing apparatus 10 through the communication line. Further, the communication control unit 201 controls connection and disconnection of sessions between the information processing apparatus 10 and the portable terminal 20 in response to the data transmission-reception request transmitted from the software modules in an upper layer (the application 101, the device driver 103, etc.) through the virtualization control unit 202.

The virtualization control unit 202 performs the virtualization control according to (interlocking to) the control request from the virtualization control unit 104 of the information processing apparatus 10 in order to control by recognizing as if the communication I/F unit 204 of the portable terminal 20 (a USB device connected through the communication I/F unit 204) is locally connected to the information processing apparatus 10.

The device control unit 203 is software for controlling a device connected to the portable terminal according to control of the virtualization control unit 202. In this embodiment, it is the software for controlling the USB device, i.e., the communication I/F unit 204, connected to the portable terminal.

The communication I/F unit 204 is a converter that converts the data format transmitted and received between the interface (LAN) of the multifunction machine 30 and the interface (USB) of the portable terminal 20. The information processing apparatus 10 recognizes the communication I/F unit 204 as a USB device (USB device that performs USB-LAN conversion).

Furthermore, the function of the communication I/F unit 204 is determined according to the interface of the multifunction machine 30. When the interface of the multifunction machine 30 is a USB, the communication I/F unit 204 becomes a USB interface, and the multifunction machine 30 is connected through a USB cable. Moreover, when the interface of the multifunction machine 30 is an NFC (Near Field Communication), a USB device that is provided with an NFC interface like a USB card reader is connected to the portable terminal 20 as the communication I/F unit 204.

For example, when the interface of the multifunction machine 30 is a WLAN, the USB device connected to the portable terminal 20 becomes a USB-WLAN conversion adaptor. Moreover, when the interface of the multifunction machine 30 is the Bluetooth (registered trademark), the USB device connected to the portable terminal 20 becomes a USB-Bluetooth (registered trademark) conversion adaptor.

In this embodiment, it is described on the assumption that the communication I/F unit 204 is built in the portable terminal 20. Furthermore, a configuration to externally attach the communication I/F unit 204 to the portable terminal 20, for example, a configuration to connect a USB-LAN conversion adaptor to the portable terminal 20, may be employed. In this case, when the USB-LAN conversion adaptor is connected to the portable terminal 20 through a cable etc., the OS (not shown) detects a plug-in and recognizes as a USB device.

The multifunction machine 30 is a multifunctional composite machine (MFP: Multi Function Peripheral) that is provided with a scanning function, a copy function, a storage function, etc. in addition to the print function, and is a device connected to the network 2. In this embodiment, it is provided with the communication I/F 301 as a communication interface, is connected to the communication I/F unit 204 of the portable terminal 20 through a LAN cable, and is controlled from the information processing apparatus 10 through the portable terminal 20. Furthermore, the multifunction machine 30 may be another device, and the communication interface is not limited to the LAN.

Figure 2:
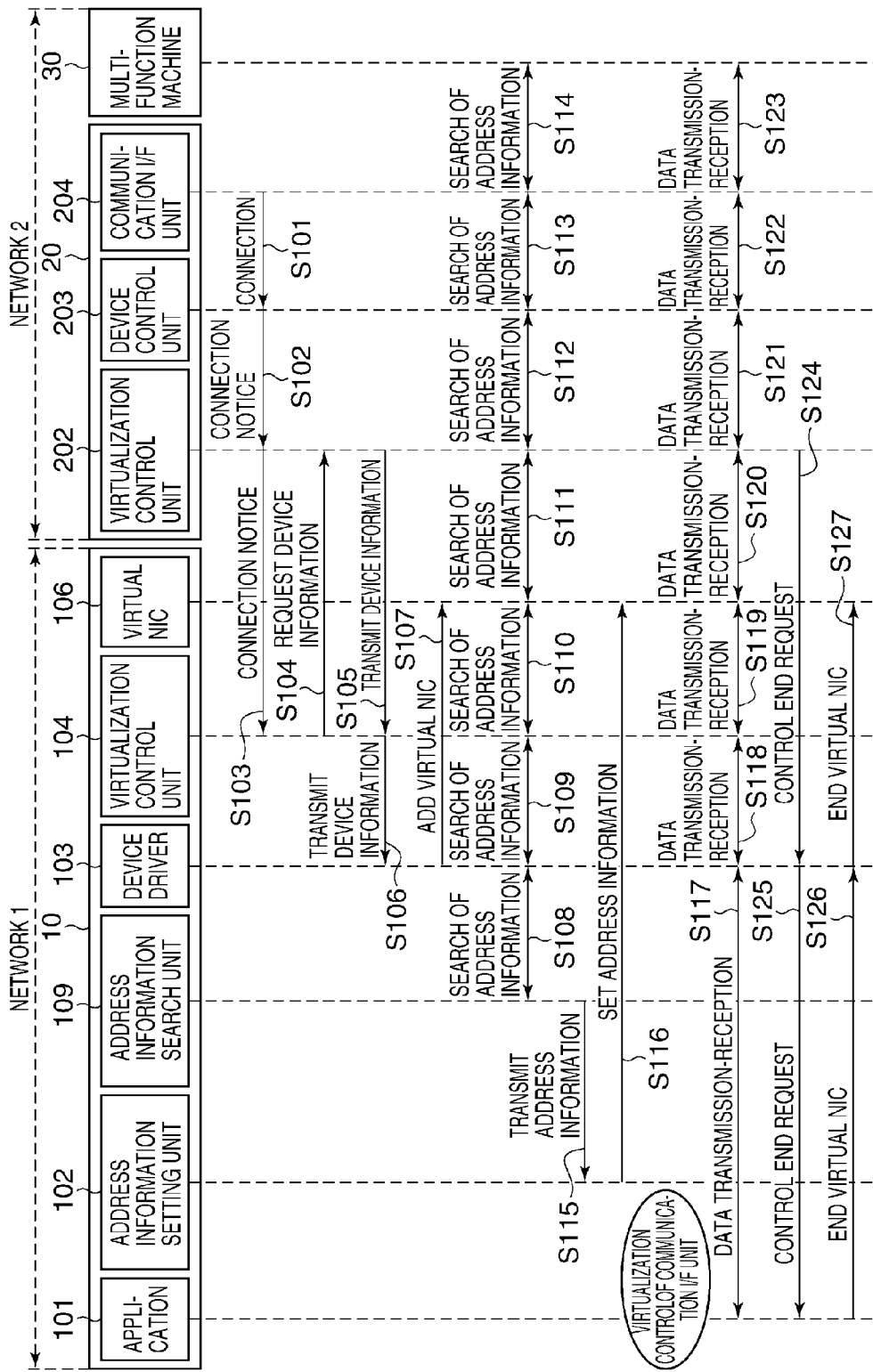
FIG. 2 is a sequence diagram showing operations of virtualization control in the device control system shown in FIG. 1.

FIG. 2 is a sequence diagram showing operations at the time of subjecting the information processing apparatus 10 on the network 1 and the multifunction machine 30 on the network 2 to the virtualization control through the portable terminal 20 in the device control system shown in FIG. 1.

The portable terminal 20 is activated by connecting the cable, which is connected to the communication I/F 301 of the multifunction machine 30 that is LAN-connected on the network 2 of the remote place, to the communication I/F unit 204 of the portable terminal 20. Otherwise, the portable terminal 20 is started by performing a predetermined connecting operation (button depression etc.) with the portable terminal 20 after connecting the cable. Accordingly, the communication I/F unit 204 is recognized as what is connected as a USB device, and the connection of the USB device is notified from the communication I/F unit 204 to the device control unit 203 (step S101).

The device control unit 203 transmits a connection notice to the virtualization control unit 202 (step S102), and the virtualization control unit 202 transmits the connection notice of the USB device to the information processing apparatus 10 through the communication control unit 201 (step S103).

The virtualization control unit 104 of the information processing apparatus 10 receives the connection notice from the portable terminal 20, and requests device information from the portable terminal 20 that is a transmitting source of this connection notice (step S104).

The virtualization control unit 202 of the portable terminal 20 receives the request of the device information from the information processing apparatus 10, and transmits the device information about the communication I/F unit 204 recognized as the USB device to the information processing apparatus 10 (step S105). In this embodiment, the information (USB descriptor information) including a vendor ID, product ID, and serial number of the communication I/F unit 204 is transmitted.

The virtualization control unit 104 of the information processing apparatus 10 receives the device information from the portable terminal 20, and transmits this device information to the device driver 103 (step S106). When receiving the device information, the device driver 103 generates (adds) the virtual NIC 106 as a communication interface for connecting with the portable terminal 20 and performing the virtualization control (step S107).

Next, the address information search unit 109 transmits a command, which aims to check existence of the multifunction machine 30 and to check a response, to a broadcast address of the network 2 in order to obtain the address information set to the communication I/F 301 of the multifunction machine 30.

In the information processing apparatus 10, this command is transmitted to the device driver 103 from the address information search unit 109 (step S108), is transmitted to the virtualization control unit 104 from the device driver 103 (step S109), is transmitted to the virtual NIC 106 from the virtualization control unit 104 through the communication control unit 105 (step S110), and is transmitted to the portable terminal 20 from the virtual NIC 106 (step S111).

In the portable terminal 20, this command is received by the virtualization control unit 202 from the information processing apparatus 10 through the communication control unit 201, is transmitted to the device control unit 203 from the virtualization control unit 202 (step S112), and is transmitted to the communication I/F unit 204 from the device control unit 203 (step S113). Then, the communication I/F unit 204 converts the command in the USB data format into the data format for transmitting and receiving through the LAN, and transmits to the communication I/F 301 of the multifunction machine 30 (step S114).

The multifunction machine 30 transmits the address information set to the communication I/F 301 to the portable terminal 20 in response to this command. The address information transmitted here is an IP address set to the communication I/F 301 of the multifunction machine 30, and may include a subnet mask and a default gateway. The address information follows a path reverse to the transmission of the above-mentioned command, and is obtained by the address information search unit 109.

The address information search unit 109 generates an arbitrary IP address within the same segment as the obtained address information set to the communication I/F 301 of the multifunction machine 30, and passes to the address information setting unit 102 (step S115).

Next, the information processing apparatus 10 sets the address information (IP address) received from the address information search unit 109 to the virtual NIC 106 with the address information setting unit 102 (step S116).

Furthermore, the address information setting unit 102 sets the address information to the virtual NIC 106 using a UI (not shown) of the information processing apparatus 10. Instead of this, a mechanism in which the portable terminal 20 transmits the address information to the information processing apparatus 10 using a UI (not shown) of the portable terminal 20, and the address information setting unit 102 of the information processing apparatus 10 sets the address information to the virtual NIC 106 may be employed.

When the address information is set to the virtual NIC 106, the virtualization control of the communication I/F unit 204 is instructed to the virtualization control unit 104 through the virtual NIC 106 concerned. The virtualization control is started by an operation on the UI screen (not shown) of the information processing apparatus 10. Instead of this, an instruction to start the virtualization control may be transmitted to the information processing apparatus 10 by a predetermined operation of the portable terminal 20.

When the information processing apparatus 10 starts the virtualization control of the communication I/F unit 204 through the virtual NIC 106, the application 101 transmits data to the device driver 103 (step S117), and the device driver 103 transmits the data to the virtualization control unit 104 (step S118). Then, the virtualization control unit 104 transmits the data to the virtual NIC 106 through the communication control unit 105 (step S119), and the virtual NIC 106 transmits the data to the portable terminal 20 (step S120).

In the portable terminal 20, the virtualization control unit 202 receives the data from the information processing apparatus 10 through the communication control unit 201, and the virtualization control unit 202 transmits the data to the device control unit 203 (step S121). Next, the device control unit 203 transmits the data to the communication I/F unit 204 (step S122), the communication I/F unit 204 converts the data in the USB format into the format to transmit and receive through the LAN, and transmits the data converted to the communication I/F 301 of the multifunction machine 30 (step S123).

The multifunction machine 30 performs operations, such as a print and a scan, in response to the received data, and transmits status data or scan data to the portable terminal 20. Such data follows a path reverse to the transmission of the above-mentioned data, and is obtained by the application 101.

By the steps S117 to S123 mentioned above, the information processing apparatus 10 transmits and receives the data with the portable terminal 20 through the virtual NIC 106, and subjects the communication I/F unit 204 of the portable terminal 20 to virtualization control. Accordingly, the information processing apparatus 10 controls the multifunction machine 30 connected to the communication I/F unit 204 while recognizing the same state as the case where it is locally connected.

When the virtualization control by the information processing apparatus 10 is ended, a predetermined ending operation (for example, depression of an end button or an operation on a UI screen) on the portable terminal 20. Accordingly, the virtualization control unit 104 of the information processing apparatus 10 transmits a control end request to the information processing apparatus 10 through the communication control unit 201 (step S124). Furthermore, the ending operation of the virtualization control can be executed even from the information processing apparatus 10 is performed.

The information processing apparatus 10 transmits the control end request received from the portable terminal 20 to the device driver 103, and the device driver 103 transmits the control end request to the application 101 (step S125).

When receiving the control end request, the application 101 instructs the virtualization control unit 104 to end the virtualization control of the communication I/F unit 204 of the portable terminal 20, and the virtualization control unit 104 ends the virtualization control of the communication I/F unit 204.

Moreover, the application 101 instructs the device driver 103 to end the virtual NIC 106 (step S126), and the device driver 103 ends the virtual NIC 106 (step S127).

Furthermore, when the communication I/F unit 204 of the portable terminal 20 is an interface other than the LAN, required setting contents are set up at the side of the information processing apparatus 10 according to the device. Otherwise, it may be set according to a device, for example, it may be set using a UI and communication application (both not shown) at the side of the portable terminal 20.

According to the first embodiment, when performing data communication between the information processing apparatus 10 on the network 1 and the multifunction machine 30 on the network 2, the portable terminal 20 is prepared at the side of the network 2. Then, when the information processing apparatus 10 on the network 1 is connected to the portable terminal 20 through the communication line, and the multifunction machine 30 is connected to the communication I/F unit of the portable terminal 20, the information processing apparatus 10 becomes possible to operate (virtualization control) the multifunction machine 30 through the communication I/F unit 204 of the portable terminal 20.

[Second Embodiment]

Figure 3:
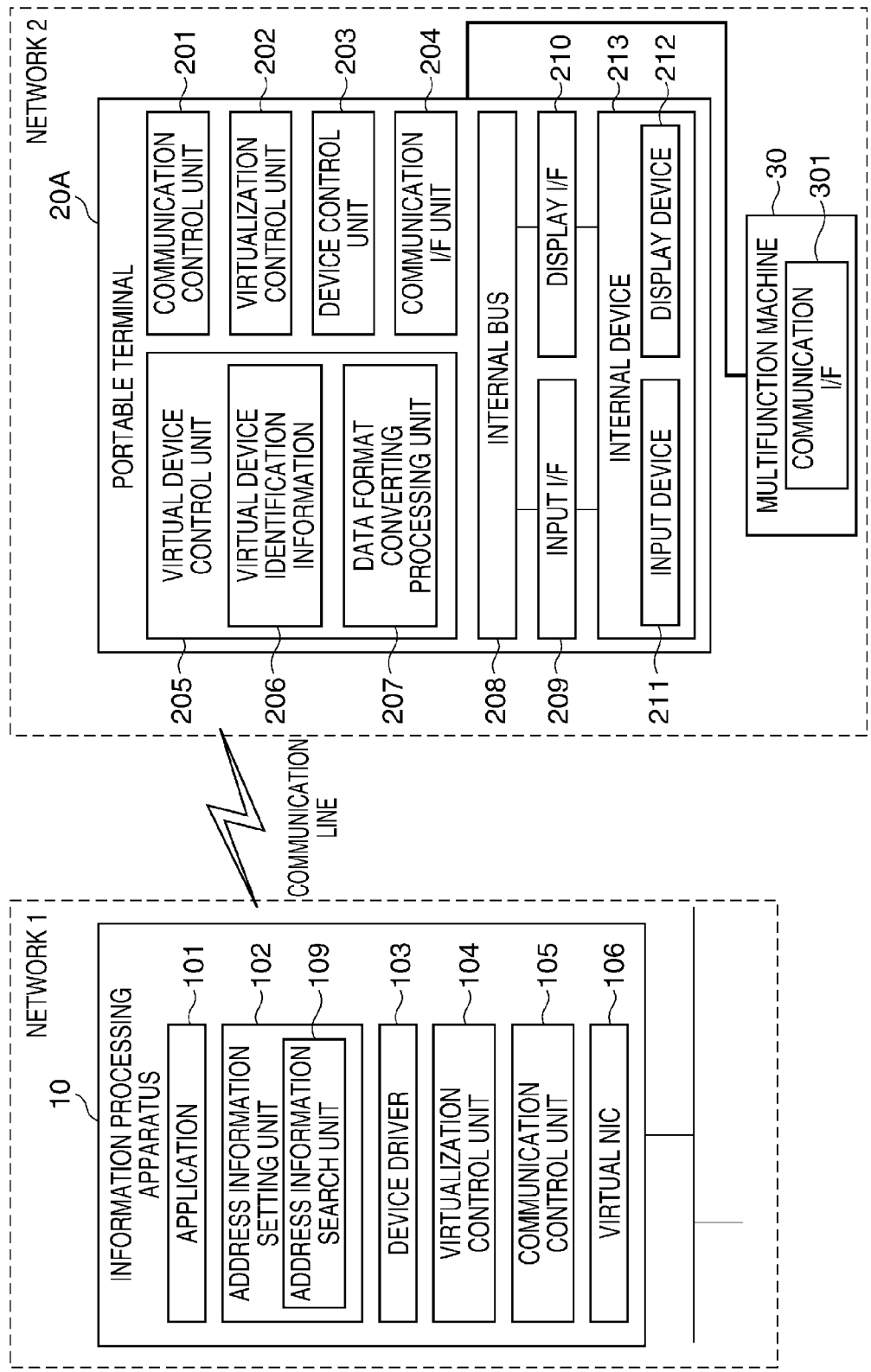
FIG. 3 is a block diagram showing an example of a schematic configuration of a device control system according to a second embodiment of the present invention.

FIG. 3 is a block diagram showing an example of a schematic configuration of a device control system according to a second embodiment of the present invention.

In the second embodiment of the present invention, an operation from an internal device of a portable terminal 20A is transmitted to the information processing apparatus 10 by subjecting the internal device (an input device, a display device) of the portable terminal 20A to virtualization control with the information processing apparatus 10. Then, the feature is at the point that the multifunction machine 30 is remotely controlled from the information processing apparatus 10.

The device control system in FIG. 3 consists of the information processing apparatus 10, the portable terminal 20A, and the multifunction machine 30, and the configuration of the portable terminal 20A differs from the device control system shown in FIG. 1. Since the other connecting configurations and components are the same as FIG. 1, the same reference numerals are applied to the same components as the components shown in FIG. 1 and their descriptions are omitted, and only different points will be described.

The portable terminal 20A is provided with a virtual device control unit 205 and an internal device 213 in addition to the configuration of the portable terminal 20 in FIG. 1.

The internal device 213 (I/O device) is provided with an input device 211 used as a user interface and a display device 212 that are respectively connected to an input I/F 209 and a display I/F 210 through an internal bus 208.

The input device 211 is a software keyboard that achieves functions of a keyboard, ten-key pad, and mouse, by software, for example. The display device 212 is a liquid crystal display monitor, for example.

The virtual device control unit 205 includes virtual device identification information 206 and a data format converting processing unit 207.

The virtual device identification information 206 is information for making the information processing apparatus 10 recognize that the input device 211 and the display device 212 of the portable terminal 20A are USB devices connected to its own apparatus.

The data format converting processing unit 207 performs the conversion process between the packet data (USB data) based on the USB data format (first data format) that is transmitted to and is received from the virtualization control unit 202 and the data in the data format (second data format) that can be processed by the internal device 213 that transmits and receives through the input I/F 209 and the display I/F 210. Furthermore, when the data format does not need the conversion, the data is transmitted and received without performing the conversion process.

The input device 211 and the display device 212 are the internal devices of the portable terminal 20A, and do not have individual identification information (device information), such as a vendor ID, product ID, and descriptor information, unlike a USB device connected with the USB interface. Accordingly, pieces of information equivalent to them are generated spuriously, are allocated to the input device 211 and the display device 212 as the virtual device identification information 206, and are stored into the virtual device control unit 205 etc.

In this embodiment, the USB descriptor that identifies an HID class is transmitted to the virtualization control unit 202 as the virtual device identification information 206 concerning the input devices 211, such as the keyboard and the mouse. Moreover, the data format converting processing unit 207 converts the input data input from the input devices 211 into the USB data of the HID class, and transmits to the virtualization control unit 202 through the input I/F 209.

Moreover, the USB descriptor that identifies vendor specific information (vendor class) is transmitted to the virtualization control unit 202 as the virtual device identification information 206 concerning the display device 212, such as the display. The data format converting processing unit 207 converts the USB data transmitted from the virtualization control unit 202 into the data format of the display device 212, and transmits to the display device 212 through the display I/F 210.

Figure 4:
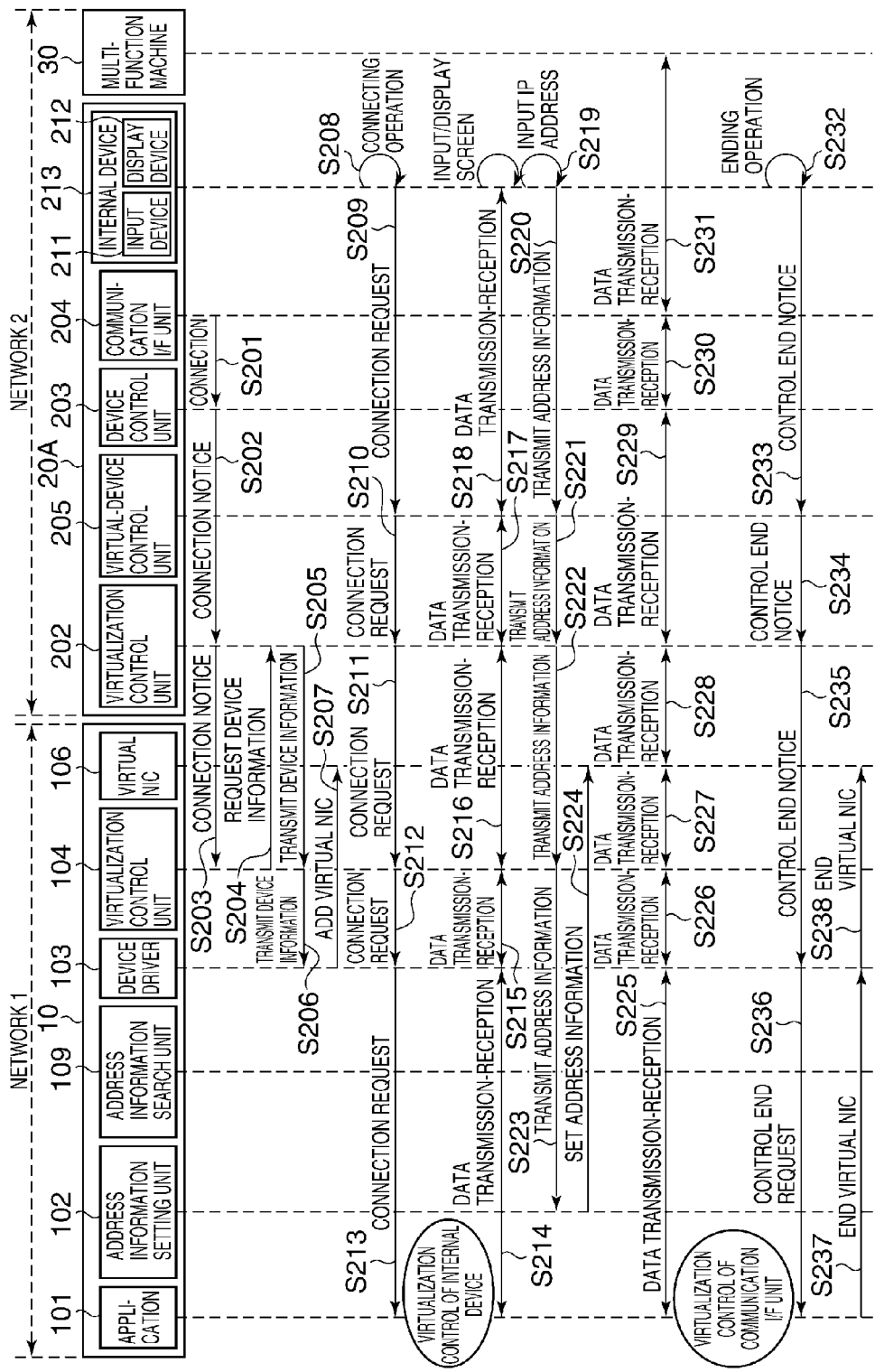
FIG. 4 is a sequence diagram showing operations of virtualization control in the device control system shown in FIG. 3.

FIG. 4 is a sequence diagram showing operations of virtualization control in the device control system shown in FIG. 3.

Since the process (steps S201 to S207) until operating the portable terminal 20A, making the information processing apparatus 10 recognize the communication I/F unit 204 as a USB device, and generating the virtual NIC 106 as a communication interface for connecting with the portable terminal 20A and performing the virtualization control, is the same as the sequence from the step S101 to the step S107 in FIG. 2 described in the first embodiment, the description is omitted.

Next, a user operates the portable terminal 20A to display an operation screen on the display device 212. Then, a connecting operation (for example, depression of a connection button) by the input device 211 is performed (step S208), the connection of the internal device 213 is requested to the virtual device control unit 205 from the internal device 213 (step S209).

When detecting the connection request, the virtual device control unit 205 transmits the connection request of the internal device 213 including the virtual device identification information 206 about the display device 212 and the input device 211 to the virtualization control unit 202 (step S210).

When receiving the connection request including this virtual device identification information 206, the virtualization control unit 202 transmits the connection request to the information processing apparatus 10 through the communication control unit 201 (step S211).

The information processing apparatus 10 transmits the connection request received from the portable terminal 20A to the virtualization control unit 104 through the virtual NIC 106, and the virtualization control unit 104 transmits this connection request to the device driver 103 (step S212). The device driver 103 transmits the connection request of the internal device 213 of the portable terminal 20A to the application 101 (step S213).

The application 101 instructs the virtualization control unit 104 to start the virtualization control of the internal device 213 corresponding to the virtual device identification information 206 included in the connection request, and the virtualization control unit 104 starts the virtualization control of the internal device 213 of the portable terminal 20A.

When the information processing apparatus 10 starts the virtualization control of the internal device 213 of the portable terminal 20A and displays a screen on the display device 212, in the information processing apparatus 10, the application 101 transmits screen data to the device driver 103 (step S214), and the device driver 103 transmits the screen data to the virtualization control unit 104 (step S215). Then, the virtualization control unit 104 transmits the screen data to the virtual NIC 106 through the communication control unit 105 (step S216), and the virtual NIC 106 transmits the screen data to the portable terminal 20A.

In the portable terminal 20A, the virtualization control unit 202 receives the screen data from the information processing apparatus 10 through the communication control unit 201, and the virtualization control unit 202 transmits the screen data to the virtual device control unit 205 (step S217). Next, the virtual device control unit 205 transmits the screen data to the display device 212 through the display I/F 210 connected to the internal bus 208 (step S218), and the screen data is displayed on the display device 212.

In the case where the information processing apparatus 10 starts the virtualization control of the internal device 213 of the portable terminal 20A and the input data input from the input device 211 is transmitted to the information processing apparatus 10, the input data received through the input I/F 209 connected to the internal bus 208 is transmitted to the application 101 through the virtual device control unit 205, the virtualization control unit 202, the virtualization control unit 104, and the device driver 103 along a path reverse to the above mentioned transmission of the screen data.

Furthermore, in the above-mentioned steps S217 and S218, the data format converting processing unit 207 of the virtual device control unit 205 converts the USB data transmitted from the virtualization control unit 202 into the data format (third data format) of the display device 212, transmits through the display I/F, receives data input by an operation of the input device 211 through the input I/F, converts this input data into the USB data (fourth data format), and transmits to the virtualization control unit 202.

Thus, the screen data (for example, an image displayed on the liquid crystal panel connected to the information processing apparatus 10) transmitted from the information processing apparatus 10 is displayed on the display device 212 of the portable terminal 20A. Moreover, an input operation similar to that through a keyboard and a ten-key pad can be performed to the information processing apparatus 10 by operating the input device 211.

The operation to the step S218 enables to operate the information processing apparatus 10 by operating the input device 211 while checking the display device 212 at the side of the portable terminal 20A.

Subsequently, the user inputs the address information (IP address) about the virtual NIC 106 generated with the information processing apparatus 10 (step S219) by operating the input device 211 while checking the display device 212 of the portable terminal 20A.

When the address information (IP address) is input from the input device 211, this address information is transmitted to the virtual device control unit 205 (step S220). The virtual device control unit 205 converts the data format, and transmits this to the virtualization control unit 202 (step S221). The virtualization control unit 202 transmits this address information to the information processing apparatus 10 through the communication control unit 201 (step S222).

The information processing apparatus 10 transmits the address information received from the portable terminal 20A to the virtualization control unit 104, and the virtualization control unit 104 transmits this address information to the address information setting unit 102 (step S223). The address information setting unit 102 sets up address information (IP address) of the same segment as the network 2 to which the multifunction machine 30 is connected to the virtual NIC 106 based on the address information (step S224).

By this address information (IP address) setting, the IP addresses of the multifunction machine 30 and the virtual NIC 106 are set in the same segment, and the information processing apparatus 10 becomes possible to transmit and receive data with the multifunction machine 30 through the portable terminal 20B.

Furthermore, as shown in the first embodiment, it is also possible to set up the IP address of the virtual NIC 106 using the address information search unit 109.

About the process (steps S225 to S231) of the data transmission and reception performed between the information processing apparatus 10 and the multifunction machine 30 through the portable terminal 20A, since it is identical to the sequence from the step S117 to the step S123 in FIG. 2 described in the first embodiment, the description is omitted.

When the virtualization control by the information processing apparatus 10 is ended, the portable terminal 20A is operated to display an operation screen on the display device 212, and the ending operation (for example, depression of the end button) by the input device 211 is performed (step S232). Next, the control end request of the internal device 213 is transmitted from the internal device 213 to the virtual device control unit 205 (step S233). Furthermore, the ending operation can be executed even from the information processing apparatus 10.

The virtual device control unit 205 transmits the control end request of the internal device 213 to the virtualization control unit 202 (step S234), and the virtualization control unit 202 transmits this control end notice to the information processing apparatus 10 through the communication control unit 201 (step S235).

The information processing apparatus 10 transmits the control end notice received from the portable terminal 20A to the device driver 103, and the device driver 103 transmits this control end request to the application 101 (step S236).

When receiving the control end request, the application 101 instructs the virtualization control unit 104 to end the virtualization control of the communication I/F unit 204 of the portable terminal 20A, and the virtualization control unit 104 ends the virtualization control of the communication I/F unit 204 (step S237). Moreover, the application 101 instructs the device driver 103 to ends the virtual NIC 106, and the device driver 103 ends the virtual NIC 106 (step S238).

Furthermore, the portable terminal 20A switches the display device 212 to the former display state, when the virtualization control of the internal device 213 ends.

Although the virtualization control for the display device (liquid crystal monitor) as the internal device of the portable terminal and for the software keyboard as the input device is described as a typical example of this embodiment, another internal device in the portable terminal can be subjected to virtualization control.

For example, when the multifunction machine 30 is provided with the communication function of NFC (near field communication), the information processing apparatus 10 subjects a card reader, built in the portable terminal 20A as a USB device (internal device) by the NFC, to virtualization control. Accordingly, the information processing apparatus 10 and the multifunction machine 30 become possible to communicate data through the communication interface of the NFC.

Moreover, when a maintenance state of the multifunction machine 30 that belongs to the network 2 of the remote place would like to be checked using an image with the information processing apparatus 10 on the network 1, a camera function built in the portable terminal 20A at the side of the network 2 is recognized as a USB device (hereinafter referred to as a "USB camera") using the virtual device identification information 206. When the information processing apparatus 10 subjects the USB camera to virtualization control, an image of the multifunction machine 30 taken by the USB camera at the side of the network 2 can be checked with the information processing apparatus 10 on the network 1.

According to the second embodiment, when the information processing apparatus 10 subjects the internal device 213 of the portable terminal 20A to virtualization control, the display screen of the information processing apparatus 10 is displayed on the display device 212 of the portable terminal 20A, and the information processing apparatus 10 can be operated using the input device 211 of the portable terminal 20A.

[Third Embodiment]

Figure 5:
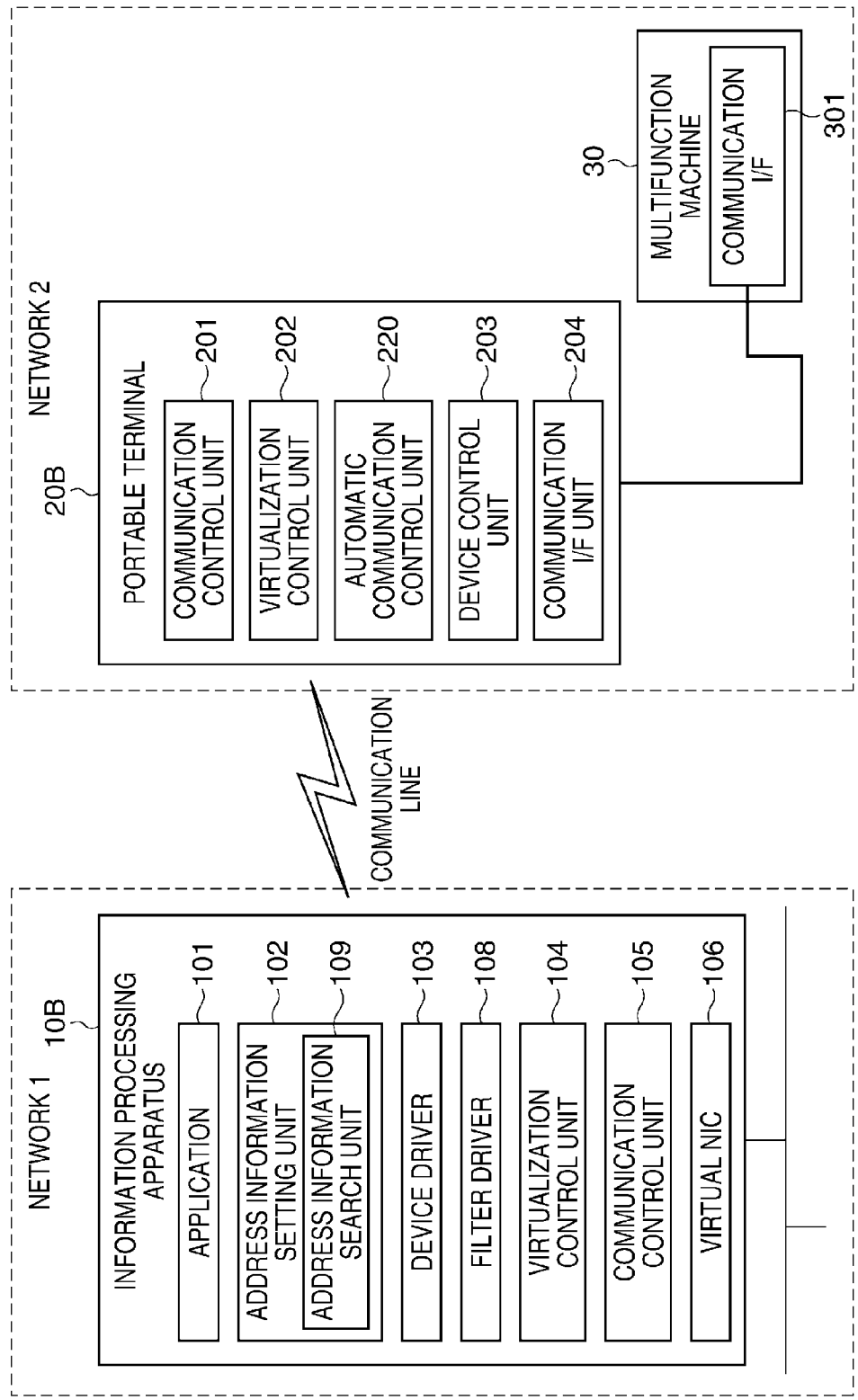
FIG. 5 is a block diagram showing an example of a schematic configuration of a device control system according to a third embodiment of the present invention.

FIG. 5 is a block diagram showing an example of a schematic configuration of a device control system according to a third embodiment of the present invention.

In the third embodiment of the present invention, the feature is at the point that an amount of network packets that are transmitted and received between an information processing apparatus 10B and a portable terminal 20B is reduced.

The device control system in FIG. 5 consists of the information processing apparatus 10B, the portable terminal 20B, and the multifunction machine 30, and the configurations of the information processing apparatus 10B and the portable terminal 20B differ from the device control system shown in FIG. 1.

The information processing apparatus 10B in FIG. 5 is provided with a filter driver 108 in addition to the configuration of the information processing apparatus 10 in FIG. 1.

The filter driver 108 has stored beforehand a transmission pattern of a periodical polling packet that is transmitted in order to check a state of a device. When receiving a transfer request from the device driver 103, the filter driver 108 generates pseudo response information (hereinafter referred to as a "pseudo response") against the transfer request. Accordingly, the filter driver 108 returns the pseudo response to the device driver 103 according to the transmission pattern until a notice which shows a change of an operating state from the communication I/F unit 204 of the portable terminal 20B recognized to be a USB device is transmitted.

Thus, a part of the packets (transfer request) sent out to the portable terminal 20 through a network (communication line) from the information processing apparatus 10B is deterred, which reduces the packet amount on the network (communication line).

The portable terminal 20B is provided with an automatic communication control unit 220 in addition to the configuration of the portable terminal 20 in FIG. 1.

The automatic communication control unit 220 has stored beforehand a transmission pattern of the polling corresponding to the transmission pattern of the filter driver 108. The automatic communication control unit 220 executes the polling to the communication I/F unit 204 according to this transmission pattern, and repeats the polling until detecting a change of the operating state of the communication I/F unit 204. Then, when detecting the change of the operating state of the communication I/F unit 204, the automatic communication control unit 220 notifies the information processing apparatus 10B of the information showing this detection (state change notice) through the communication control unit 201.

Thus, a part of the packets sent out to the information processing apparatus 10B through the network (communication line) from the portable terminal 20B is deterred, which reduces the packet amount on the network (communication line).

Furthermore, the transmission pattern information about the polling packet that either one of the information processing apparatus 10B or the portable terminal 20B has may be transmitted to the other apparatus.

Figure 6:
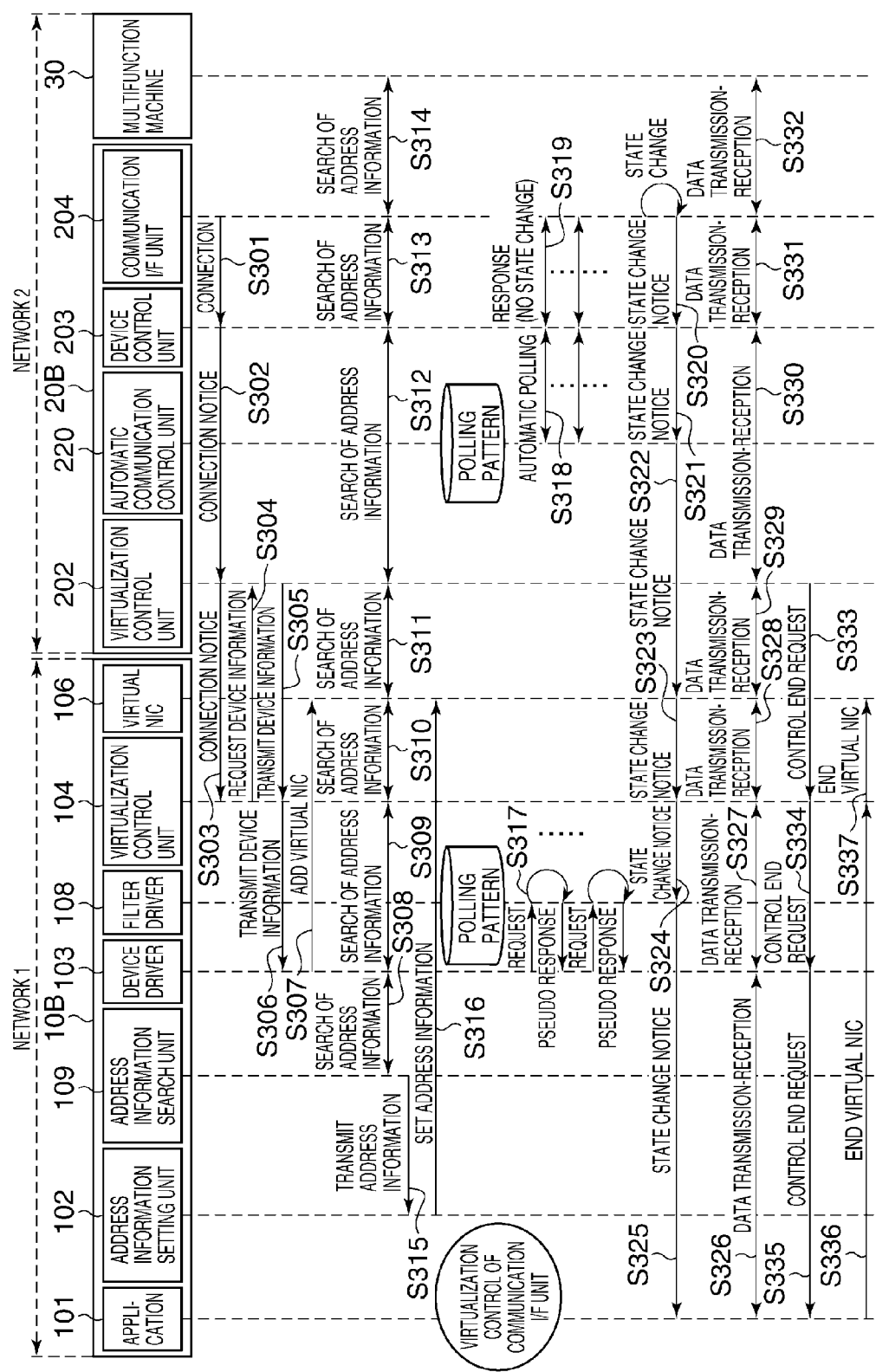
FIG. 6 is a sequence diagram showing operations of virtualization control in the device control system shown in FIG. 5.

FIG. 6 is a sequence diagram showing operations of the virtualization control in the device control system shown in FIG. 5. Furthermore, it will be described on the assumption that the filter driver 108 of the information processing apparatus 10B and the automatic communication control unit 220 of the portable terminal 20B have stored beforehand the transmission pattern of the periodical polling packet that is transmitted in order to check the state of a device.

First, since the process (steps S301 to S316) until operating the portable terminal 20B, making the information processing apparatus 10B recognize the communication I/F unit 204 as a USB device, generating the virtual NIC 106 as a communication interface for connecting with the portable terminal 20B and performing the virtualization control, and setting the address information to the virtual NIC 106 is the same as the sequence from the step S101 to the step S116 in FIG. 2 described in the first embodiment, the description is omitted.

The information processing apparatus 10B starts polling by the filter driver 108, when the network session for the virtualization control is started with the portable terminal 20B. For example, when the device driver 103 issues a communication request of the interrupt transfer of USB, the filter driver 108 generates a pseudo response to this communication request according to the transmission pattern of the polling packet stored beforehand, and returns to the device driver 103 (step S317).

When receiving the pseudo response, the device driver 103 recognizes that the response from the communication I/F unit 204 of the portable terminal 20B is received by the periodical polling, and issues the next communication request. This is repeated until receiving a state change notice (mentioned later) from the communication I/F unit 204 of the portable terminal 20B.

On the other hand, in the portable terminal 20B, when the network session for the virtualization control is started with the information processing apparatuses 10B, the automatic communication control unit 220 transmit a polling packet (for example, the communication request of interrupt transfer of USB) to the device control unit 203 (step S318). Next, the device control unit 203 transmits the polling packet to the communication I/F unit 204 (step S319). The process in these steps S318 to S319 is repeated until detecting a change of the operating state of the communication I/F unit 204.

When the operating state of the communication I/F unit 204 changes, the device control unit 203 is notified of this change of the operating state (step S320). Next, the device control unit 203 transmits this notice (hereinafter referred to as a "state change notice") to the automatic communication control unit 220 (step S321). The automatic communication control unit 220 transmits the state change notice received to the information processing apparatus 10B through the communication control unit 201 (step S322).

The Virtual NIC 106 of the information processing apparatus 10B transmits the state change notice received from the portable terminal 20B to the virtualization control unit 104 (step S323). Next, the virtualization control unit 104 transmits this state change notice to the filter driver 108 (step S324). The filter driver 108 transmits this state change notice to the application 101 (step S325).

When the application 101 receives the state change notice from the filter driver 108, the information processing apparatus 10B becomes possible to transmit and receive data with the multifunction machine 30 through the portable terminal 20B.

About the process (steps S326 to S332) of the data transmission and reception performed between the information processing apparatus 10B and the multifunction machine 30 through the portable terminal 20B, since it is identical to the sequence from the step S117 to the step S123 in FIG. 2 described in the first embodiment, the description is omitted.

Moreover, since the process (steps S333 to S337) for ending the virtualization control by the information processing apparatus 10B is identical to the sequence from the step S124 to the step S127 in FIG. 2 described in the first embodiment, the description is omitted.

According to the third embodiment, the polling packet, which the device driver 103 of the information processing apparatus 10B sends out periodically to the portable terminal 20B, and the response to this polling packet are issued onto the network not every time. Accordingly, the amount of issues of the network packets between the information processing apparatus 10B and the portable terminal 20B can be reduced.

Although the present invention was described on the basis of the embodiments, the present invention is not limited to these embodiments, the present invention includes various modifications as long as the concept of the invention is not deviated.

Although, the device control system shown in the first to third embodiment is constituted by the information processing apparatus, the portable terminal, and the multifunction machine, each of which is one set, the numbers thereof are not limited to the illustrated example. Moreover, the multifunction machine 30 is not limited to office equipment, and may be various embedded devices, a cellular phone, or mobile terminal equipment.

The embodiment of the present invention is attained by a computer of a system or an apparatus (or a device like a CPU or an MPU) that reads and executes a program stored in a storage unit in order to achieve the function of the embodiment mentioned above, Moreover, a step is attained by reading and running the program stored in the storage unit also by the method executed by computer of a system or an apparatus, in order to achieve the function of the embodiment mentioned above, for example. For this, a program is supplied to a computer through a network or from various storage media that play a role of a storage unit (for example, a computer-readable medium), for example.

Although the present invention is described with reference to exemplary embodiments, it should not be understood to be restricted to the disclosed exemplary embodiments. The following claims should be most widely interpreted so as to include all modified examples, and an equivalent configuration and function.

This application is a bypass continuation application of PCT International Application PCT/JP2013/085325 filed on Dec. 25, 2013 which is based on and claims priority from Japanese Patent Application No. 2012-288309, filed Dec. 28, 2012 and Japanese Patent Application No. 2013-247802, filed Nov. 29, 2013, the contents of which are hereby incorporated by reference herein in their entirety.

What is claimed is:

1. An information processing apparatus connected to a portable terminal through a first network, the information processing apparatus comprising:
   a processor configured to execute:
   a virtual interface generation task that obtains individual identification information that a first interface unit of the portable terminal has, and generates a virtual interface based on the individual identification information concerned;
   an address information obtaining task that obtains address information from a device connected to the portable terminal through a second network;
   an address information setting task that changes a part of the address information obtained by the address information obtaining task and sets the changed address information to the virtual interface; and
   a virtualization control task that simulates a device connected to the first interface unit of the portable terminal through the virtual interface as if the device concerned were directly connected to the virtual interface.

2. The information processing apparatus according to claim 1, further comprising a change-of-state detection task that spuriously generates response information over request information transmitted to the first interface unit from a higher layer and notifies the spuriously generated response information to the higher layer until change of an operating state of the first interface unit of the portable terminal is detected.

3. A portable terminal equipped with a first interface unit that transmits and receives data in a first data format and a second interface unit that transmits and receives data in a second data format, the portable terminal comprising:
   a processor configured to execute:
   an individual identification information transmitting task that transmits individual identification information of the first interface unit to an information processing apparatus connected to the portable terminal through a first network;
   an address information obtaining task that obtains address information from a device connected to the portable terminal through a second network;
   an address information transmitting task that transmits the address information obtained by the address information obtaining task to the information processing apparatus based on the individual identification information;
   a virtualization control task that simulates a device connected to the first interface unit through a virtual interface that the information processing apparatus generates based on the individual identification information as if the device concerned were directly connected to the virtual interface; and
   a data format converting task that converts the first data format and the second data format mutually when the virtualization control task makes the information processing apparatus simulate the device concerned.

4. The portable terminal according to claim 3, further comprising an identification information storage task that stores virtual device identification information for making the information processing apparatus identify a predetermined function of the portable terminal as an internal device connected to the portable terminal,
   wherein the processor executes:
   an identification information transmitting task that transmits the virtual device identification information to the information processing apparatus; and
   a virtual device control task that performs data communication between the internal device and the portable terminal in a third data format and performs data communication between the information processing apparatus and the portable terminal in a fourth data format and controlling, when the information processing apparatus controls the internal device that is identified according to the virtual device identification information.

5. The portable terminal according to claim 3, wherein the processor executes an address information setting task that sets address information to the virtual interface.

6. The portable terminal according to claim 3, wherein the processor executes an automatic communication control task that spuriously generates request information transmitted from the information processing apparatus and transmits the generated request information to the first interface unit concerned, and controls not to transmit response information over the spuriously generated request information to the information processing apparatus until change of an operating state of the first interface unit is detected.

7. A control method for an information processing apparatus connected to a portable terminal through a first network, the control method comprising:
   a virtual interface generation step of obtaining individual identification information that a first interface unit of the portable terminal has, and generating a virtual interface based on the individual identification information concerned;
   an address information obtaining step of obtaining address information from a device connected to the portable terminal through a second network;
   an address information setting step of changing a part of the address information obtained by the address information obtaining step and setting the changed address information to the virtual interface; and
   a virtualization control step of simulating a device connected to the first interface unit of the portable terminal through the virtual interface as if the device concerned were directly connected to the virtual interface.

8. The control method according to claim 7, further comprising a change-of-state detection step of spuriously generating response information over request information transmitted to the first interface unit from a higher layer and notifying the spuriously generated response information to the higher layer until change of an operating state of the first interface unit of the portable terminal is detected.

9. A control method for a portable terminal equipped with a first interface unit that transmits and receives data in a first data format and a second interface unit that transmits and receives data in a second data format, the control method comprising:
- an individual identification information transmitting step of transmitting individual identification information of the first interface unit to an information processing apparatus connected to the portable terminal through a first network;
- an address information obtaining step of obtaining address information from a device connected to the portable terminal through a second network;
- an address information transmitting step of transmitting the address information obtained by the address information obtaining step to the information processing apparatus based on the individual identification information;
- a virtualization control step of simulating a device connected to the first interface unit through a virtual interface that the information processing apparatus generates based on the individual identification information as if the device concerned were directly connected to the virtual interface; and
- a data format converting step of converting the first data format and the second data format mutually when the virtualization control step makes the information processing apparatus simulate the device concerned.

10. The control method according to claim 9, wherein the portable terminal comprises an identification information storage unit that stores virtual device identification information for making the information processing apparatus identify a predetermined function of the portable terminal as an internal device connected to the portable terminal,
wherein the control method comprises:
- an identification information transmitting step of transmitting the virtual device identification information to the information processing apparatus; and
- a virtual device control step of performs data communication between the internal device and the portable terminal in a third data format and performs data communication between the information processing apparatus and the portable terminal in a fourth data format and controlling, when the information processing apparatus controls the internal device that is identified according to the virtual device identification information.

11. The control method according to claim to 9, further comprising an address information setting step of setting address information to the virtual interface.

12. The portable terminal according to claim 9, further comprising an automatic communication control step of spuriously generating request information transmitted from the information processing apparatus and transmitting the generated request information to the first interface unit concerned, and controlling not to transmit response information over the spuriously generated request information to the information processing apparatus until change of an operating state of the first interface unit is detected.

* * * * *